April 28, 1953 H. E. LOCKERY ET AL 2,636,920

LEADS TO LAMINATED ELECTRIC CIRCUIT COMPONENTS

Filed July 18, 1950

INVENTORS
HARRY E. LOCKERY
BARTON L. WELLER
BY Beale & Jones
ATTORNEYS

Patented Apr. 28, 1953

2,636,920

UNITED STATES PATENT OFFICE 2,636,920

LEADS TO LAMINATED ELECTRIC CIRCUIT COMPONENTS

Harry E. Lockery, New Haven, and Barton L. Weller, Easton, Conn., assignors to Vitramon Incorporated, Stepney, Conn.

Application July 18, 1950, Serial No. 174,502

2 Claims. (Cl. 173—324)

This invention relates to methods of attaching leads to ceramic blocks of dielectric material which carry on their outer surface areas of metallic silver. More particularly, it relates to improvements in making electrical connections to electrical components composed of ceramics and silver.

An important object of this invention is to provide a reliable method of attaching electrical conductors to ceramic electrical components. Another object is to provide this connection while still retaining insulated areas over the majority of the component without using insulating coatings. Also, another object is to produce unusual physical strength at the point where the lead is attached. A further object of this invention is to display a method of obtaining these desirable characteristics while attaching leads to more than one component simultaneously. These and still further objects of this invention will be apparent from the ensuing disclosure of certain preferred embodiments thereof.

In the accompanying drawing forming a part of this specification and in which like numerals are used to designate like parts throughout the same.

It is common practice in the electrical industry to use dielectrics of ceramic materials. Electrodes and conductors used in conjunction with these dielectrics are silver powder applied to the ceramic in an appropriate vehicle and caused to bond to the ceramic and to coalesce into a continuous layer by sintering the piece. Such silver areas may form part of the electrode systems of the component itself or may be terminations of other electrodes or other systems within or on the piece. In any case, such external areas may be used to conduct electric currents to and from the component. Therefore, commonly electrical conductors are soldered, brazed, welded or otherwise attached to these areas.

Since, frequently components are supported on their leads, it is necessary that the attachment have adequate strength. To improve the strength of the bond between the silver and the ceramic, certain ceramic fluxes may be added to the silver powders so that during the sintering operation these fluxes will bond the ceramic. Also, it is frequently found desirable to use ceramic dielectrics which have a low enough fusing temperature to flux easily with the silver and produce a strong bond. We have found that the silver-ceramic junction will have enormously more strength in shear than it will in tension. Therefore, it is extremely advantageous to arrange the lead attachment in such a manner so that all silver areas are stressed in shear rather than in tension.

Figures 1, 2:
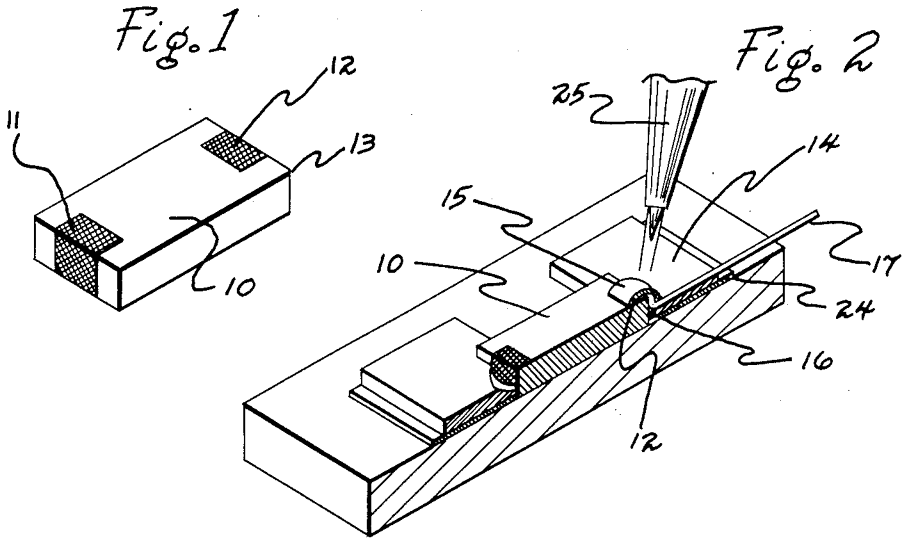
Fig. 1 is a perspective view of a typical ceramic component.
Fig. 2 is a cross-sectional view through the major axis of a typical component with leads being attached.

To accomplish this desirable end we apply the silver areas designated by the numerals 11 and 12 to a component block 10 in Fig. 1, over the edges of the piece as shown in Fig. 1. When the lead is soldered on both the top and end faces, forces in any direction on this lead will result principally in shear stresses and cause the attachment to have much greater strength than if the lead were attached to only one surface. Furthermore, the areas are so placed that only the top and ends of the component have exposed electrical terminals. The corners 13, sides, bottom and most of the top are insulated.

By this invention this method of lead attachment can be greatly facilitated if a small mold is arranged at the end of the component 10 to form the molten solder about the edge of the component. This mold is made of a heat-resistant material such as asbestos board. Such a mold is provided by the block 14 as shown in Fig. 2 which limits the flow of the solder 15 and forms the fillet 16 under the solder. Each lead may be straight or pre-formed before soldering. When attaching leads to thick pieces, it is preferred to preform the lead as shown in Fig. 2 in order that it may emerge from the piece near its center axis.

Figure 3:
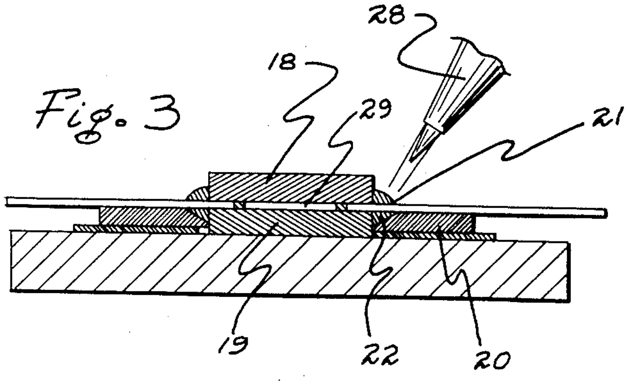
Fig. 3 is a cross-sectional view through the major axis of two components being joined while attaching leads.

Furthermore, we have found it possible to utilize this same system to attach leads to two components 18 and 19 simultaneously as is shown in Fig. 3. Here again, a mold is formed by block 20 which limits the flow of the solder 21 to the cavity 22. The same strength qualities are maintained on two pieces as previously on one since the edge attachment of Fig. 3 results in similar shear stresses as previously described and shown in Fig. 2.

The principles of our invention can be understood better by describing their use in attaching leads to vitreous enamel capacitors. Their application is not in any way limited to this item specifically since by this invention the attainment of strength by attaching the lead to two surfaces which intersect one another at an angle can be realized wherever this condition exists. A capacitor made in accordance with the copending application of P. W. Lee and B. L. Weller, Serial No. 174,496, filed July 18, 1950, can be provided with end terminations 11 and 12, as shown in Fig. 1. These are obtained by painting these areas with powdered silver in an appropriate vehicle as specified in the said copending application. The capacitors are then fired at a temperature to vitrify the enamel, coalesce the silver, and bond the silver to the enamel. With these materials it is not necessary to add a frit to the silver powder as it is if the base enamel were not vitrified to coalesce the silver. After firing, the silver areas will be thoroughly bonded to the enamel.

It is sometimes desirable to burnish the silver to improve its ability to be wet by the solder. This can be done with a mild abrasive, such as a rubber eraser containing sand, or by wire burnishing brushes or the like. The piece should then be placed adjacent to the block 14, Fig. 2, such that the cavity 16 is adjacent to the silver area 12. The lead 17 which may be preformed as shown or straight is then placed at the corner of the piece as shown in Fig. 2. If the piece 10 is thick, it is not necessary that the cavity 16 be fully as deep as the thickness of the piece 10, therefore 16 can be so made as to allow the solder 15 to come down the end of the piece 10 an intermediate distance, for example .05''. The optimum depth of this cavity can be conveniently adjusted by raising or lowering the block 14 with the shim 24.

Solder can then be applied to the junction of the lead and the sliver in a manner common to the art. It is desirable to use fluxes to reduce the oxidation of the solder and the lead, which may be of any metal; for example, tinned copper. Common rosin in alcohol is found to be adequate. The solder may be fed in wire form to the joint, may be preformed, or may be dropped as a liquid on the joint. In any case, provision must be made to apply heat gradually to the capacitor in order to prevent heat shock. One convenient method of accomplishing this heating is to apply a flame 25 at the angle shown in Fig. 2. If the heat, to the component and the lead, is applied before the solder is introduced, no heat shock will result. Also, the solder will quickly bond to the warm metal parts. In order that thorough bonding be obtained to the silver at the end of the piece it is necessary that the solder be fluid so that it can run into the cavity 16, and intimately contact the end surface. It is, therefore, necessary that the mold 14 and cavity 16 be used to support the solder 15 while it is in this fluid condition. Simultaneously, the surface tension of the liquid solder will act on the upper surface of the solder to give a symmetrical geometry.

After the solder has flowed as described above and bonded to the metal parts, flame can be removed and the parts allowed to cool. The care required in cooling to prevent heat shock is dependent on the temperature required for soldering. 50% lead and 50% tin solders which melt at approximately 200° C. will require little care and can easily be melted with ordinary gas flames, soldering irons, or electrical resistance heat, for example. Solders of 90% lead melting at temperatures of the order of 350° C. will require higher temperatures such as acetylene or hydrogen flames, or induction heating. Sufficient heat should be provided to form the joint in not more than ten seconds. If more extensive times are used it will be found that the solder will amalgamate the silver and the bond to the ceramic will be destroyed. The tendency to amalgamate can be considerably reduced if silver is alloyed with the solder to the amount of 2% to 5%.

Figure 4:
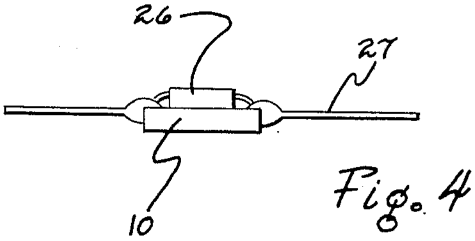
Fig. 4 is a side elevational view of a capacitor and resistor assembly.

The piece can then be reversed and the lead attached to the opposite end in the same manner. Obviously, the leads may be attached simultaneously by performing these operations on both ends at the same time. Also, the lead attachment procedures can be made continuous through providing this sequence of operations by automatic or semi-automatic means. Also, the system need not be limited to only two leads, since, on occasion, more than two terminals may be put on a single piece. Also, leads of other geometry, such as, ribbons or tape may be used. Similarly, the lead may be common to some other component; for example, a resistor may be laid on the top surface and the resistor lead attached to the capacitor in this manner. Such an assembly would be as shown in Fig. 4 with resistor 26 on the capacitor 10. The resistor leads 27 have been pre-formed to be adjacent to the edges of capacitor 10 so they may be attached as previously described.

The same strength can be obtained in leads attached to two capacitors simultaneously. Here it is found desirable to attach leads to one capacitor as described in Fig. 2, and then to invert this capacitor over a second and remelt the solder to bond the two units together. Fig. 3 shows the solder 21 and lead 27 which have previously been attached to capacitor 18. This completed unit is then inverted over capacitor 19 which has been positioned adjacent to cavity 22 in mold 20. A flame 28 is again applied as shown in Fig. 3 and the solder is melted to flow into the cavity 22. The surface tension of the solder forms a fillet above the lead and gives symmetry to the joint.

It has been found desirable to use an excess of solder when soldering the first capacitor 18 in order that sufficient solder is available to bond 18 and 19. To maintain symmetry the lead 27 is used straight although it may be preformed. Although the leads can be attached to the capacitor 18 in any order, it is desirable that the lead attachment to piece 19 be done on both ends simultaneously in order that the best alignment of all parts can be realized. Also, it is important that the space 29 between the capacitors exist. If this space is restricted, it will become a reservoir for water vapor which can cause electrical leakage across the capacitors. However, if this space is left open, these internal areas can be cleaned and treated simultaneously with the outer surfaces with water repellent materials, such as, silicones, in the same manner as is common art in treating the outer surfaces of ceramic electrical components.

It will thus be seen that there are provided a method and device which achieve the several objectives of this invention and which are well adapted to meet the conditions of practical use.

As various possible embodiments are above set forth, it is to be understood that all matter herein set forth or shown in the accompanying drawings is to be interpreted as illustrative and not in a limiting sense.

We claim:

1. An electric circuit component comprising a ceramic block having a conductive metallic coating on a face and an edge of said block, said edge being adjacent to and disposed approximately right-angularly to said face, an electric lead connected to said ceramic block said lead having an offset-shaped terminal portion including a terminal part, an electrical lead part and an interconnecting part therebetween, said terminal and electric lead parts being positioned in spaced substantially parallel planes, said terminal part being positioned upon the conductive metal coated surface of at least one of said face and edge areas of said block and said interconnecting part being positioned upon the remaining of said areas, said interconnecting part being substantially normal to both said terminal and electric lead parts, and a coating of solder surrounding and embedding said offset-shaped terminal portion and said conductive metal surfaces of said block, whereby the application of forces to said electrical lead part placing said part under tension produces only shear stresses in said terminal and interconnecting parts.

2. An electrical component as set forth in claim 1 wherein said terminal part and said electrical lead part are parallel.

HARRY E. LOCKERY.
BARTON L. WELLER.

References Cited in the file of this patent

UNITED STATES PATENTS

| Number | Name | Date |
|---|---|---|
| 997,420 | Seng | July 11, 1911 |
| 2,157,918 | Rankin | May 9, 1939 |
| 2,253,026 | Godsey | Aug. 19, 1941 |
| 2,354,409 | Strasser | July 25, 1944 |
| 2,381,025 | Addink | Aug. 7, 1945 |
| 2,389,018 | Ballard | Nov. 13, 1945 |
| 2,398,088 | Ehlers | Apr. 9, 1946 |
| 2,398,176 | Deyrup | Apr. 9, 1946 |
| 2,416,887 | Tibbetts | Mar. 4, 1947 |
| 2,418,461 | Becker | Apr. 8, 1947 |
| 2,539,873 | Steinhoff | Jan. 30, 1951 |

FOREIGN PATENTS

| Number | Country | Date |
|---|---|---|
| 440,951 | Great Britain | Jan. 6, 1936 |
| 478,602 | Great Britain | Jan. 21, 1938 |